United States Patent
Omae et al.

(10) Patent No.: US 7,716,245 B2
(45) Date of Patent: May 11, 2010

(54) CONTENT DISTRIBUTION SYSTEM AND METHOD

(75) Inventors: Koji Omae, Yokohama (JP); Yoichi Matsumoto, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 267 days.

(21) Appl. No.: 11/329,099

(22) Filed: Jan. 11, 2006

(65) Prior Publication Data

US 2006/0171535 A1 Aug. 3, 2006

(30) Foreign Application Priority Data

Jan. 11, 2005 (JP) .............................. 2005-004410

(51) Int. Cl.
*G06F 7/00* (2006.01)
(52) U.S. Cl. .................................... 707/787
(58) Field of Classification Search .................. 707/1–2, 707/6, 9, 104.1, 783, 785, 787
See application file for complete search history.

(56) References Cited

U.S. PATENT DOCUMENTS

| | | | |
|---|---|---|---|
| 6,093,215 A * | 7/2000 | Buxton et al. | 717/107 |
| 6,195,794 B1 * | 2/2001 | Buxton | 717/108 |
| 6,448,979 B1 | 9/2002 | Schena et al. | |
| 6,968,060 B1 * | 11/2005 | Pinkas | 380/277 |
| 7,191,332 B1 * | 3/2007 | Pankajakshan et al. | 713/163 |
| 2004/0025052 A1 * | 2/2004 | Dickenson | 713/201 |
| 2005/0114367 A1 * | 5/2005 | Serebrennikov | 707/100 |
| 2007/0106892 A1 * | 5/2007 | Engberg | 713/168 |
| 2008/0228651 A1 * | 9/2008 | Tapsell | 705/65 |

FOREIGN PATENT DOCUMENTS

| | | |
|---|---|---|
| CN | 1352765 A | 6/2002 |
| EP | 1 365 339 A2 | 11/2003 |
| JP | 2001-352321 | 12/2001 |
| JP | 2002-208900 | 7/2002 |
| JP | 2002-342292 | 11/2002 |
| JP | 2003-209546 | 7/2003 |
| WO | WO 01/46782 A2 | 6/2001 |
| WO | WO 03/067375 A2 | 8/2003 |

OTHER PUBLICATIONS

Takao Nakamura, et al., "Fast Watermark Detection Scheme for Camera-equipped Cellular Phone", MUM2004, XP-002379929, Oct. 27, 2004, pp. 101-108.

* cited by examiner

*Primary Examiner*—James Trujillo
*Assistant Examiner*—Linh Black
(74) *Attorney, Agent, or Firm*—Oblon, Spivak, McClelland, Maier & Neustadt, L.L.P.

(57) ABSTRACT

In a content distribution method, two or more certification marks (130) are produced for the content to be delivered, each of the certification marks containing a temporary access information item defining an accessing right to the content. Each of the certification marks is distributed to a user at a shop. In a content delivery server, two or more content delivery information items are stored in association with the content, each of the delivery information items containing said temporary access information item. A network device (120) reads the temporary access information item from the certification mark purchased by the user. The network device accesses the content delivery server (110) using the temporary access information item, and receives the content from the content delivery server.

7 Claims, 2 Drawing Sheets

CONTENT DISTRIBUTION SYSTEM AND METHOD

FIELD OF THE INVENTION

The present invention relates to a content distribution system that allows a network device or a data reproducing device (such as an audio/video player) to directly access a content server to acquire a content to be played without using a data processing apparatus (such as a personal computer) between them, while allowing easy and secure payment.

BACKGROUND OF THE INVENITON

Online content delivery for delivering electronic content including books, music pieces, or video works via a network is becoming popular; however, it is difficult in reality for content delivery services to increase the market share, as compared with over-the-counter (OTC) sales.

One reason is that conventional content delivery systems require users to use information processing apparatuses, such as personal computers, to purchase and receive content data (in the form of either data download or stream delivery). The content data received at the personal computer are sent to a data reproducing apparatus, such as an audio system or a video system, via wired or wireless data transmission, or using a recording medium. Then the content is played back.

The process of using a computer to access a content delivery server to acquire content data is often bothersome for users. In addition, many users do not like online payment from the viewpoint of security.

Another reason is that in network sales users cannot take actual products in hand to check the contents. Some people may value the exterior artistry of products.

SUMMARY OF THE INVENTION

Accordingly, it is an object of the invention to provide a content distribution system that allows a network device (such as a digital data player) to acquire desired content data directly from a content delivery server without using an information processing apparatus (such as a personal computer), while allowing easy and secure payment for the content.

To achieve the object, physical marks or tags are distributed to users at a shop. A network device, such as a portable player or a video/audio system, reads an access information item from the tag, and accesses a content delivery server using the access information item to acquire the associated content.

In one aspect of the invention, a content delivery server is provided. The content delivery server comprises:
(a) a storage unit configured to store two or more content delivery information items in association with content to be delivered, each of the content delivery information items including a temporary access ID defining an accessing right to the content;
(b) a certification mark generating unit configured to produce a certification mark containing an access information item corresponding to the content delivery information item, the access information item including said temporary access ID; and
(c) a data delivery unit configured to deliver the content upon receiving a request for the content specified by the temporary access ID read from a physical representation of the certification mark.

As a preferred example, the content delivery server may further comprise an encrypting unit configured to encrypt the content when delivering the content. In this case, the storage unit stores the content delivery information items, each of the content delivery information items consisting of a pair of said temporary access ID and a temporary encryption key used to encrypt the content in response to the request.

In another aspect of the invention, a content distribution method is provided. The method includes the steps of:
(a) producing two or more certification marks for the content; each of the certification marks containing a temporary access information item defining an accessing right to the content;
(b) distributing each of the certification marks to a user at a shop;
(c) storing in a content delivery server two or more content delivery information items in association with the content, each of the delivery information items containing said temporary access information item;
(d) allowing a network device to read the temporary access information item from the certification mark purchased by the user; and
(e) accessing the content delivery server from the network device using the temporary access information item to acquire the content specified by the temporary access information item.

BRIEF DESCRIPTION OF THE DRAWINGS

Other features and advantages of the invention will become more apparent from the following detailed description when read in conjunction with the accompanying drawings, in which.

DETAILED DESCRIPTION OF THE PREFERRED EMBODIMENT

The preferred embodiment of the present invention is described below in conjunction with the attached drawings.

Figure 1:
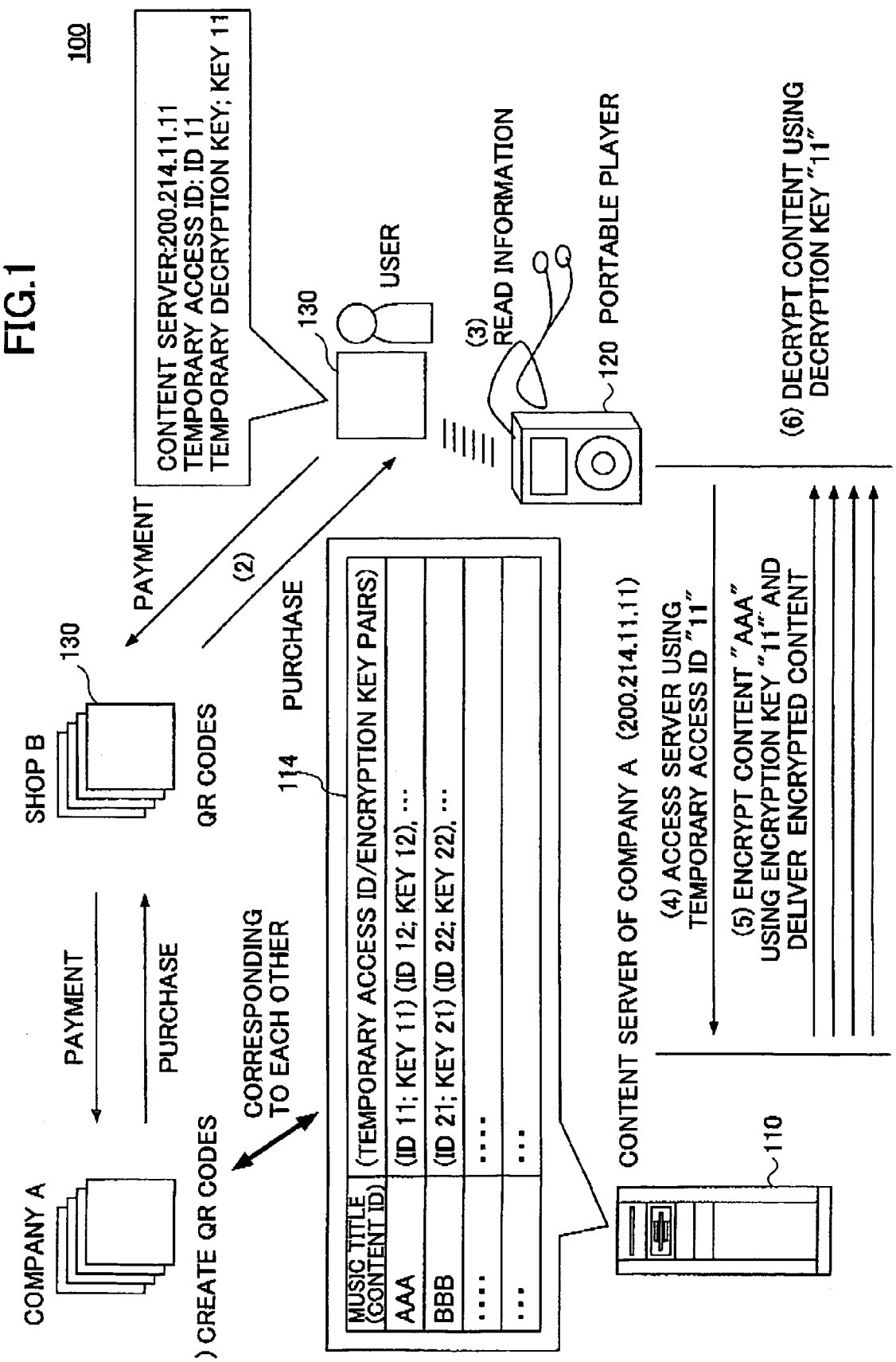
FIG. 1 is a schematic diagram illustrating a content delivery system according to an embodiment of the invention.

FIG. 1 is a schematic diagram illustrating a content distribution system 100 according to an embodiment of the invention. The content distribution system 100 includes a content server 110 that delivers content data, and a network device (or a data reproducing device) 120 that accesses the content server 110 to acquire the desired content. In this system, QR codes (or any type of physical representation of certification marks) 130 are produced as an access information bearing medium by a content provider, such as a publisher, a music label, or a film company, and distributed to users at shops to allow network devices 120 to access the content server 110 to acquire the corresponding content.

Figure 2:
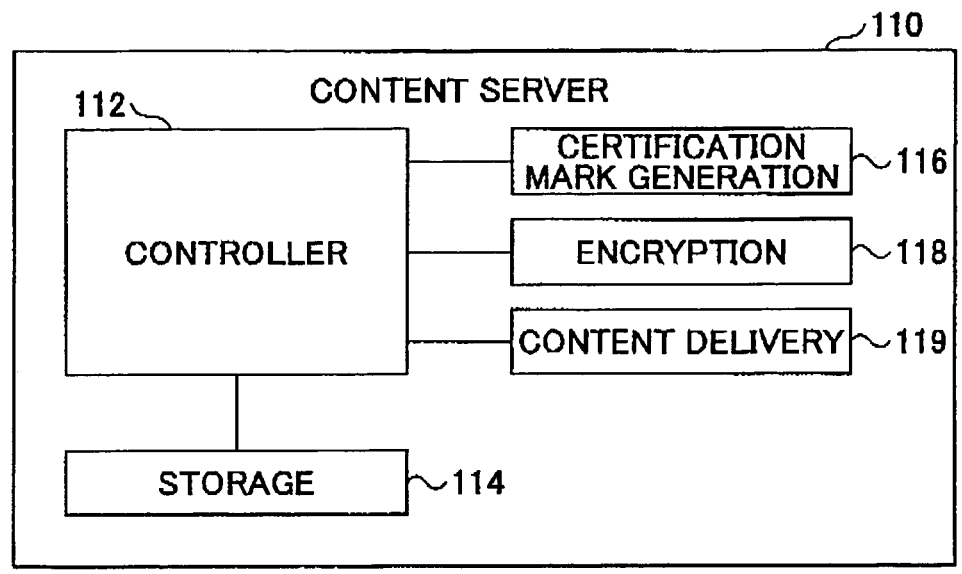
FIG. 2 is a schematic block diagram of a content delivery server according to an embodiment of the invention.

FIG. 2 is a block diagram of the content server 110. The content server 110 has a controller 112, a storage unit 114, a certification mark generating unit 116, an encrypting unit 118, and a content delivering unit 119, which units are connected to the controller 112.

The storage unit 114 stores content items representing music pieces, video works, literary works, etc. The storage unit 114 also stores content delivery information items in association with each of the content items in order to deliver a specific content item in response to a specific access from a network device 120. For example, a number of pairs of temporary access ID and temporary encryption key are stored in association with each of the content items or the content IDs.

The temporary access ID is, for example, a one-time access ID or a limited access ID with limited downloading (e.g., maximum 3 times). In FIG. 1, content delivery information items, (access ID 11; encryption key 11), (access ID 12; encryption key 12), . . . , (access ID 1n; encryption key 1n) are stored in association with a music title or a content ID "AAA". Similarly, content delivery information items, that is, access ID/encryption key pairs (access ID 21; encryption key 21), (access ID 22; encryption key 22), . . . , (access ID 2n; encryption key 2n) are stored in association with a music title or a content ID "BBB". Each of the temporary access ID/encryption key pairs corresponds to one of the QR codes 130 to be distributed to users.

Returning to FIG. 2, the certification mark generating unit 116 creates certification marks, each mark containing access information items required for a network device 120 to acquire the content from the content server 110. For example, a content server ID (or the IP address of the content server), a temporary access ID, and a temporary decryption key are contained in the certification mark. The certification mark may be of any suitable type, such as an RF tag, a stamp, or an optically readable graphic, other than the form of the two-dimensional code. The certification mark is printed out as a physical mark (QR code 130 in this example). The QR code 130 is to be distributed to a user at a shop.

Upon receiving a request for a specific content item from the network device 120, the encrypting unit 118 encrypts the content using a encryption key allocated to that access from the network device 120, prior to the delivery of the content. The content delivering unit 119 delivers the encrypted content to the user, as described below.

Figure 3:
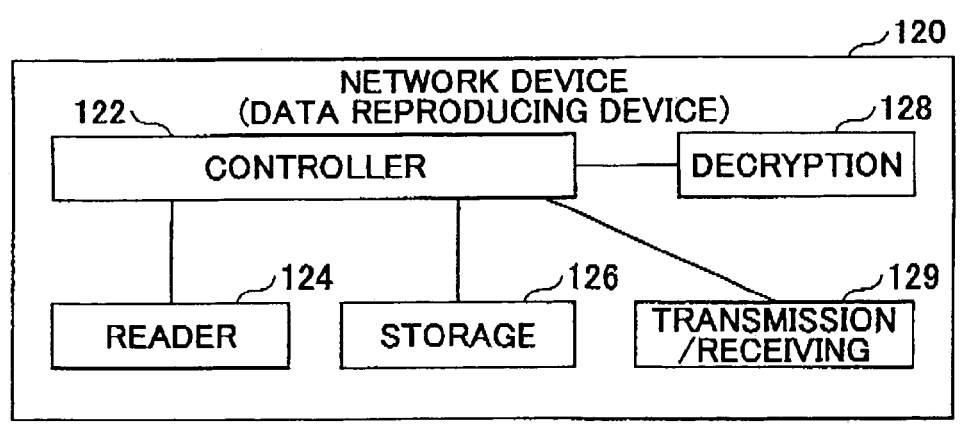
FIG. 3 is a schematic block diagram of a network device according to an embodiment of the invention.

FIG. 3 is a block diagram of a network device 120. The network device 120 includes a controller 122, a reader 124, a storage unit 126, a decrypting unit 128, and a transmission/receiving unit 129, which units are connected to the controller 122.

The reader 124 reads the access information items from a QR code 130 that is a printout or a physical representation of the certification mark created by the content server 110. In this example, the reader 124 reads the content server IP address, the temporary access ID, and the temporary decryption key. The storage unit 126 stores these information items read from the QR code 130. The transmission/receiving unit 129 accesses the content server 110 using the IP address of the content server 110 and the temporary access ID to request the content server 110 to deliver the content specified by the access ID. The transmission/receiving unit 129 receives the encrypted content from the content server 110. The decrypting unit 128 decrypts the content using the temporary decryption key.

Returning to FIG. 1, explanation is made of a content distribution method according to an embodiment of the invention. In this example, music contents are distributed. A record label (company A) manufactures and sells music CDs. The company A has a content server 110 with the IP address "200.214.11.11". In the storage unit 114 of the content server 110, as many access ID/encryption key pairs as the number of certification marks created for a content item by the certification mark generating unit 116 are stored in association with that content. This means that each access ID/encryption key pair is only available for a single access. Each pair representing (access ID; encryption key) corresponds to the (access ID; decryption key) pair contained in the corresponding certification mark.

Company A prints out the certification marks as QR codes 130, and ships them to music shop B (Process (1) in FIG. 1). The music shop B sells QR codes 130 as well as music products. A user purchases a QR code 130 of a desired content item at the casher desk of shop B in order to acquire the content from the content server 110, instead of or together with an actual music disk (Process (2)). The QR code contains information items required to acquire the content from the content server 110, which are the content server IP address, a temporary access ID, and a temporary decryption key, as has been described above.

The package of an actual product (a music disk in this example) may be displayed for sale to allow the user to check the package and confirm the table of contents of the product. In this case, the QR codes 130 produced for this music disk are stocked and controlled separately from the products.

For example, shop B may have an open space which customers freely access to buy products, a controlled space which only authorized store staff members are permitted to access, and a cash desk at which customers pay for products and/or QR codes 130. Actual products are displayed in store shelves in the open space, while printed QR codes 130 or package jackets to which QR codes 130 are attached are kept in the controlled space to prevent the QR codes 130 from being stolen.

A user purchases a QR code 130 of music content "AAA", instead of or in addition to a music disk titled "AAA" (Process (2) in FIG. 1). The QR code 130 contains the IP address "200.214.11.11" of the content server 110, a temporary access ID "11", and a temporary decryption key "11".

These information items are read from the QR code 130 purchased by the user into the network device 120, such as a portable music player (Process (3) in FIG. 1). To be more precise, the reader 124 of the network device 120 reads the IP address of the content server 110, the temporary access ID, and the temporary decryption key from the QR code 130. The controller 122 of the network device 120 access the IP address read from the QR code 130 and transmits the access ID "11" to the content server 110 (Process (4) in FIG. 1).

The controller 112 of the content server 110 receives the access ID "11", and retrieves the content "AAA" corresponding to the access ID "11" from the storage unit 114. The encrypting unit 118 encrypts the content "AAA" using the encryption key "11" that corresponds to the access ID "11". The content delivering unit 119 delivers the encrypted content "AAA" to the portable player 120 (Process (5) in FIG. 1). The delivering unit 119 may be configured to limit the number of accesses based on the same QR code 130 to prevent limitless content delivery.

Upon receiving the encrypted content "AAA", the decrypting unit 128 of the portable player (network device) 120 decrypts the content using the decryption key "11" read from the QR code 130 (Process (6) in FIG. 1). If the content is downloaded, the portable player 120 stores the decrypted content in the storage 126. If the content is delivered as a stream, the portable player 120 plays back and outputs the content "AAA" upon decryption.

In this manner, a system of production, distribution, sales, and consumption of music content is constituted. The user does not have to buy and use an information processing apparatus, such as a personal computer, to obtain a specific content.

The user simply purchases a certification mark at a cashier desk and has the network device read the access information from the certification mark to acquire desired content, without using a personal computer. By including the access information in the certification mark to be distributed to users, access from a network device to a specific content server is automated. By allowing the user to pay for the certification mark at a cashier desk, the user does not have to disclose the payment information, such as a credit card number, through the network.

Although the invention has been described using the distribution of music content as an example, the invention is not limited to this example. The content distribution system of the present invention can be applied to distribution of video or film pieces, books, and other content. In addition, access information of a different level may be contained in the certification mark depending on the price of the certification mark. The certification mark may be physically represented as an RF tag, a stamp, or an optically readable graphic. The network device may be any type of data reproducing device, other than a portable player, as long as it has a reader and a communication function. These and other modifications and substitutions are also included in the scope of the present invention that is defined by the appended claims.

This patent application is based on and claims the benefit of the earlier filing date of Japanese Patent Application No. 2005-004410 filed Jan. 11, 2005, the entire contents of which are hereby incorporated by reference.

What is claimed is:

1. A system, comprising:
a multimedia content server configured to provide a user with a multimedia content requested by the user; and
a network device configured to communicatively couple to the multimedia content server, the network device configured to obtain the requested multimedia content from the multimedia content server,
the multimedia content server comprising:
a storage unit configured to store one or more multimedia contents and one or more pairs of access IDs and encryption keys, each of the pairs being associated with the respective multimedia contents, the access ID identifying the associated multimedia content and having a limited number of access allowed times, the encryption key encrypting the associated multimedia content;
a certification mark generation unit configured to generate an optically readable barcode associated with each of the multimedia contents,
the barcode including
an access ID identifying the associated multimedia content,
a network address for the content server storing the associated multimedia content, and
a decryption key decrypting the associated multimedia content encrypted with the associated encryption key;
an encryption unit configured to encrypt, in response to a receipt of an access ID associated with the requested multimedia content in the storage unit from the network device, the multimedia content with an encryption key associated with the multimedia content; and
a data delivery unit configured to transmit the encrypted multimedia content to the network device,
the network device comprising:
a reading unit configured to read, in response to a presentation of a barcode associated with the requested multimedia content and physically obtained by the user from a retailer, the barcode and to extract the access ID, the network address for the multimedia content server and the decryption key associated with the requested multimedia content;
a transmission and reception unit configured to access the extracted network address, to transmit the extracted access ID to the multimedia content server, and to receive the requested multimedia content encrypted by the multimedia content server; and
a decryption unit configured to decrypt the encrypted multimedia content with the extracted decryption key,
wherein the network device is allowed to use a certain access ID to access the multimedia content associated with the certain access ID the limited number of access allowed times.

2. The system of claim 1, wherein the network device is configured to automatically access the multimedia content server after the reading unit reads the barcode.

3. A method of obtaining a multimedia content from a multimedia content server via a network device, the method comprising: generating an optically readable barcode associated with a multimedia content;
obtaining the barcode associated with the multimedia content requested by a user from a retailer, the barcode including an access ID identifying the associated multimedia content and having a limited number of access allowed times, a network address for the multimedia content server storing the associated multimedia content, and a decryption key decrypting the associated multimedia content;
reading the barcode at the network device and extracting the access ID, the network address for the multimedia content server and the decryption key;
accessing the extracted network address to transmit the extracted access ID to the multimedia content server;
encrypting the multimedia content associated with the transmitted access ID and transmitting the encrypted multimedia content to the requesting network device; obtaining the requested multimedia content from the multimedia content server, the multimedia content server storing one or more multimedia contents and one or more pairs of access IDs and encrypting the one or more multimedia contents, one of the encryption keys encrypting the associated multimedia content; and
decrypting the transmitted multimedia content with the extracted decryption key,
wherein the network device is allowed to use a certain access ID to access the multimedia content associated with the certain access ID the limited number of access allowed times.

4. The method of claim 3, wherein the obtaining step comprises controlling access by the user to the barcode while displaying actual products associated with the barcodes.

5. The method of claim 3, wherein information about payment for the barcode is not transmitted to the multimedia content server.

6. The method of claim 3, wherein the accessing step is allowed to be performed for the same access ID up to only the limited number of access allowed times.

7. The method of claim 3, wherein the multimedia content is received at the network device by streaming or downloading.

* * * * *